United States Patent
Suzuki et al.

(10) Patent No.: US 6,246,659 B1
(45) Date of Patent: Jun. 12, 2001

(54) LASER LIGHT POWER CONTROL METHOD FOR RECORDING ON OPTICAL DISK AND LASER DIODE DRIVING CIRCUIT FOR OPTICAL DISK RECORDING DEVICE

(75) Inventors: Yoshiaki Suzuki; Kazuhiko Honda, both of Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/184,372

(22) Filed: Nov. 2, 1998

(30) Foreign Application Priority Data

Nov. 5, 1997 (JP) .................................................. 9-319080

(51) Int. Cl.[7] .................................................. G11B 7/00
(52) U.S. Cl. .......................................... 369/116; 369/59.11
(58) Field of Search .................................. 369/116, 100, 369/54, 58, 57, 59, 109, 13

(56) References Cited

U.S. PATENT DOCUMENTS

| | | | |
|---|---|---|---|
| 4,998,237 | * 3/1991 | Osakabe et al. | 369/116 |
| 5,109,373 | * 4/1992 | Ohno et al. | 369/116 |
| 5,291,470 | * 3/1994 | Nishiuchi et al. | 369/116 |

FOREIGN PATENT DOCUMENTS

| | | |
|---|---|---|
| 5143990 | 11/1991 | (JP) . |
| 5143991 | 11/1991 | (JP) . |

* cited by examiner

Primary Examiner—Thang V. Tran
Assistant Examiner—Kim-Kwok Chu
(74) Attorney, Agent, or Firm—Pillsbury Winthrop LLP (57) ABSTRACT

Recording pulses are each provided in a train of divided pulses, one of which has a greater pulse width than the other divided pulse. Laser light power emitted by a laser diode is detected at predetermined timing corresponding to the greater-width divided pulse, and an electric current for driving the laser diode is controlled in such a manner that the detected laser light power appropriately follows a predetermined laser power value. Thus, in the case where the recording pulses are each provided in a train of divided pulses, this arrangement can accurately detect the laser light power and thereby achieves high-precision control of the laser light power.

15 Claims, 9 Drawing Sheets

LASER LIGHT POWER CONTROL METHOD FOR RECORDING ON OPTICAL DISK AND LASER DIODE DRIVING CIRCUIT FOR OPTICAL DISK RECORDING DEVICE

BACKGROUND OF THE INVENTION

The present invention relates to a laser light power control method for use in recording on optical disks, such as a CD-R, CD-RW, DVD-R, DVD-RAM and MO, to control the recording laser light power to follow a predetermined reference power value, and a laser diode driving circuit using such a laser light power control method. More particularly, the present invention relates to an improved technique which can control the recording laser light power from a laser diode with high precision by accurately detecting the laser light power in cases where each recording pulse is provided in a train of divided pulses.

In recording or reproducing data on an optical disk by use of laser light power, it is necessary to control, with high precision, recording or reproducing laser light power that is predetermined depending on the optical disk used. To this end, the so-called ALPC (Automatic Laser Power Control) technique has been used which constantly detects the laser light power during the recording or reproduction operation and performs control to provide the predetermined recording or reproducing laser light power on the basis of the detected power value.

Figure 2:
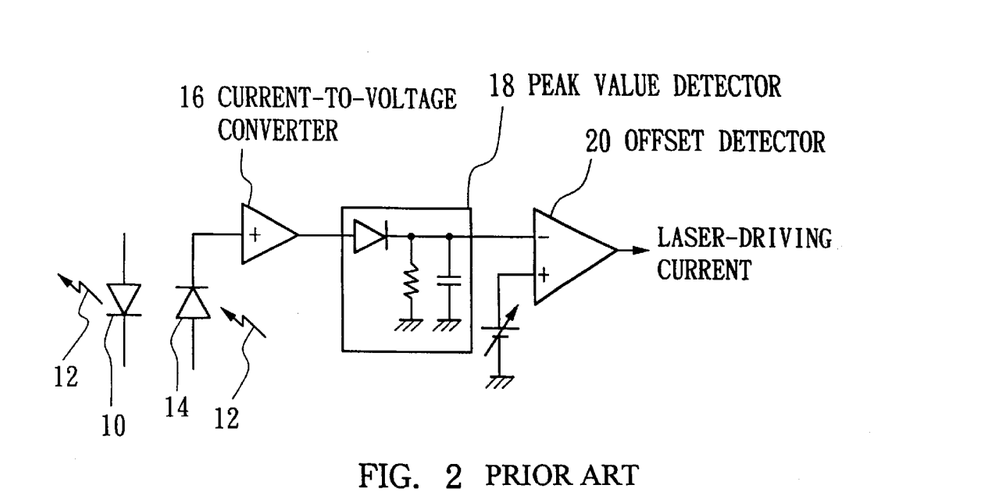
FIG. 2 is a circuit diagram showing an example of a conventional laser diode driving circuit.

In FIG. 2, there is shown one example of a conventional laser diode driving circuit for optical recording based on such an ALPC technique. Laser diode 10 emits laser light 12 for recording or reproducing data to or from an optical disk. The emitted laser light 12 from the diode 10 is received by a monitor diode 14 provided within an optical pickup, and an output electric current from the monitor diode 14 is converted into a voltage signal via a current-to-voltage converter 16. Peak value detector circuit 18 detects a peak value of the output voltage from the current-to-voltage converter 16; the detected peak value represents laser light power that is actually irradiated onto the optical disk. Offset detector circuit 20 detects a difference or offset between the detected peak value from the peak value detector circuit 18 and a predetermined reference laser light power value and thereby outputs an offset voltage value representative of the offset. Value of an electric current to drive the laser diode 10 is then controlled in accordance with the offset voltage from the offset detector circuit 20 so that the laser light 12 is constantly controlled to provide predetermined recording laser light power.

Figure 3:
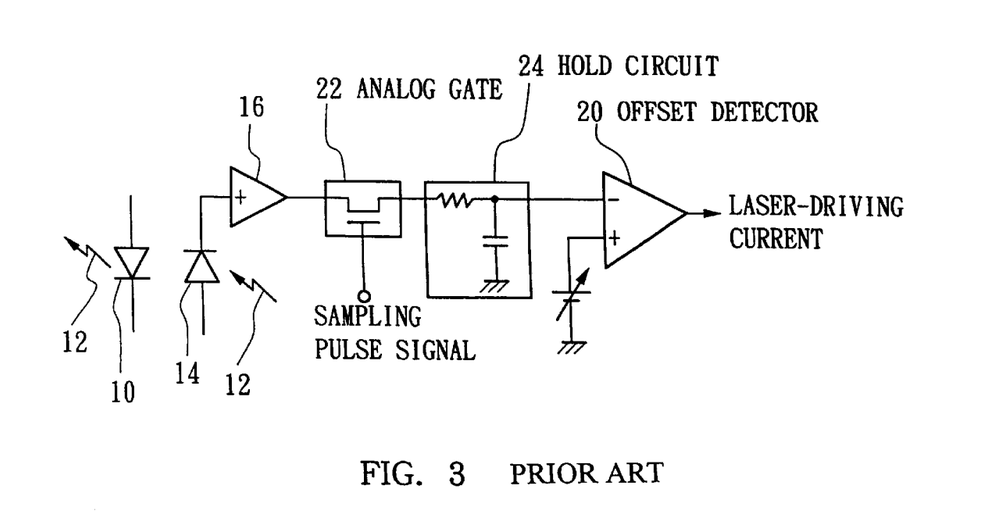
FIG. 3 is a circuit diagram showing another example of the conventional laser diode driving circuit.

In FIG. 3, there is shown another example of the conventional laser diode driving circuit, which includes a laser diode 10, monitor diode 14 and current-to-voltage converter 16 similar to those of FIG. 2. In the example of FIG. 3, an output voltage from the current-to-voltage converter 16 is sent to an analog gate circuit 22, where it is sampled in response to a sampling pulse that is generated at predetermined timing corresponding to a recording pulse. The sampled voltage value is held by a hold circuit 24; the thus-held voltage value represents laser light power that is actually irradiated onto the optical disk. Offset detector circuit 20 detects a difference or offset between the voltage value held in the hold circuit 24 and a target laser light power value and thereby outputs an offset voltage value representative of the offset. Value of an electric current to drive the laser diode 10 is then controlled in accordance with the offset voltage from the offset detector circuit 20 so that the laser light 12 is constantly controlled to provide predetermined recording or reproducing power.

Another-type laser diode driving circuit has been known, which is designed to constantly detect a value of a driving current flowing through the laser diode and control the laser-driving current value to follow a predetermined reference value for the recording or reproduction purpose.

Among various known techniques for recording data on an optical disk is the so-called "divided pulse recording", which is characterized by dividing each recording pulse, for forming a single pit on the optical disk, into a train of smaller-width pulses (hereinafter called "divided pulses"). This divided pulse recording technique has the advantage that it can effectively minimize errors in the pit width and length due to excessive heat accumulation.

However, in cases where the laser diode driving circuit of FIG. 2 or 3 is employed in the divided pulse recording, each of the divided pulses tends to have too small a width with the result that the current-to-voltage converter 16 is unable to appropriately follow the pulse frequency, which would result in the output waveform of the converter 16 loosing necessary sharpness, i.e., becoming dull. Such a dull output waveform of the converter 16 would prevent accurate detection of the laser light power, and thus the laser light power could not be controlled with high precision. Further, the laser diode driving circuit of FIG. 3 could not achieve high-speed, high-density recording using the divided pulse recording technique, because of a limited switching speed of the analog gate circuit 22.

Furthermore, with the above-mentioned conventional technique which detects a value of a driving current flowing through the laser diode and controls the driving current value to follow a predetermined reference value for recording or reproduction, it was not possible to control the laser light power with high precision due to the fact that a "driving-current vs. output-laser-lightpower" characteristic of the laser diode would greatly vary due to thermal drift and various other physical changes occurring with the passage of time.

SUMMARY OF THE INVENTION

It is therefore an object of the present invention to provide a laser light power control method which, in divided pulse recording, can accurately detect laser light power and thereby control the laser light power with high precision, as well as a laser diode driving circuit using such a method.

According to an aspect of the present invention, there is provided a method of controlling laser light power to be used for recording information on an optical disk in accordance with a mark-length recording scheme using recording laser light power emitted from a laser diode driven by a recording signal including recording pulses, which comprises the steps of: providing each of the recording pulse in divided pulses, one of the divided pulses having a greater pulse width than the other divided pulses; detecting the recording laser light power at predetermined timing corresponding to the one divided pulse having the greater pulse width; and controlling an electric current for driving the laser diode in such a manner that the recording laser light power detected by the step of detecting follows a predetermined reference power value.

Because of the arrangement that one of the divided pulses in the recording pulse has a greater pulse width than the other divided pulse and the recording laser light power is controlled at predetermined timing corresponding to such a greater-width divided pulse, a circuit for detecting laser light power need not have a high-speed response characteristic. Thus, the laser light power control method of the present invention can accurately detect the laser light power and thereby control the laser light power to appropriately follow a predetermined reference value with high precision.

Figure 4A:
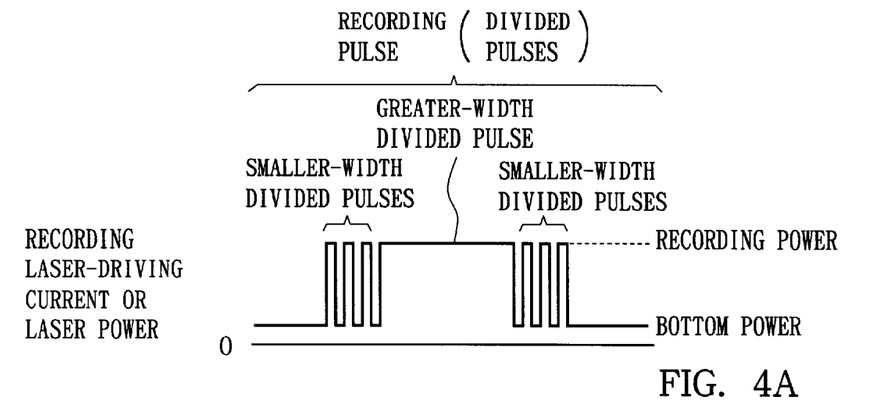
FIGS. 4A to 4C are waveform diagrams showing examples of recording pulses employed in the present invention.
Figure 4B:
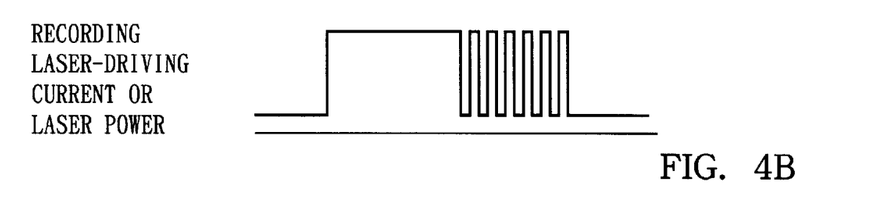
Figure 4C:
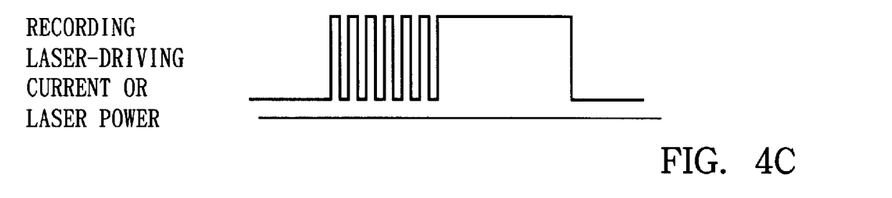

As shown in FIG. 4, the greater-width divided pulse can be placed selectively at a central position (FIG. 4A), leading or fore position (FIG. 4B) or trailing or rear position (FIG. 4C) of the divided pulse train. However, placing the greater-width divided pulse at the central position or leading position of the divided pulse train is more preferable in that it can minimize the possibility of a rear end portion of a pit being excessively expanded rearward under the influence of residual heat.

Further, such a greater-width divided pulse may be placed only in a particular divided pulse train for forming a selected pit length, rather than being placed in every divided pulse train irrespective of the pit length. Particularly, if the greater-width divided pulse is placed only in the divided pulse train for a greatest- or near-greatest pit length, the proportion of the greater-width divided pulse to the total length of a resultant pit can be reduced to a significant degree, and thus it is possible to minimize adverse influence of the greater-width divided pulse on the pit formation, such as an erroneous pit length. For example, in the case of recording on an optical disk based on the CD standard, such as a CD-R or CD-RW, where pits are formed to lengths between 3T and 11T, the laser light power can be detected and controlled at regular intervals if the greater-width divided pulse is placed in a pit-forming divided pulse train of each 11T—11T synchronizing signal.

Similarly, in the case of recording on an optical disk based on the DVD standard, such as a DVD-R or DVDRAM, where pit lengths are between 3T and 11T for data and 14T for each synchronizing signal, the laser light power can be detected and controlled at regular intervals if the greater-width divided pulse is placed in a pit-forming pulse train of each 14T synchronizing signal. In stead of or in addition to placing the greater-width divided pulse in a divided pulse train for a greatest pit length, the greater-width divided pulse may be placed in a divided pulse train for a near-greatest pit length, such as 10T length in the CD-standard disk or 11T length in the DVD-standard disk.

Figure 5:
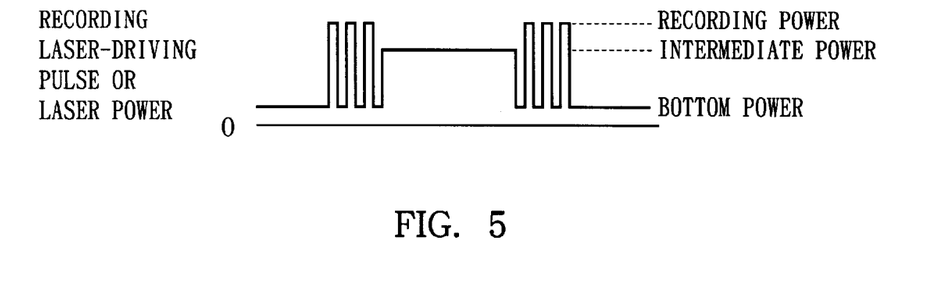
FIG. 5 is a waveform diagram showing another example of the recording pulses employed in the present invention.

Value of the electric current for driving the laser diode (i.e., laser-driving current value) may be uniform irrespective of the different lengths of the divided pulses as in the illustrated example of FIG. 4. Alternatively, the laser-driving current value for the greater-width divided pulse may be made smaller than that for the other (smaller-width) divided pulse as shown in FIG. 5; this alternative can effectively reduce the possibility that a pit formed by the greater-width divided pulse is excessively expanded widthwise or a rear end portion of the pit is expanded rearward. Because the laser light power produced by the smaller-width divided pulse (recording laser light power) can not be detected directly in this case, detection is made of the laser light power in between the recording pulses (hereinafter referred to as bottom laser light power) and the laser light power produced by the greater-width divided pulse (intermediate laser light power), and the laser-driving current is controlled in such a manner that the bottom laser light power and intermediate laser light power follow respective predetermined reference values. Recording laser-driving current value to achieve a reference recording laser light power value that is predetermined for the smaller-width divided pulse is then determined on the basis of the thus-controlled laser-driving current values and a "driving-current vs. output-laser-lightpower" characteristic of the laser diode, and the laser-driving current value for the smaller-width divided pulse is ultimately controlled by the thus-determined recording laser-driving current value. This arrangement can control the recording laser light power to follow the predetermined reference value with high precision.

According to another aspect of the present invention, there is provided a laser diode driving circuit which employs the above-mentioned laser light power control method. Namely, the laser diode driving circuit comprises: a recording signal output circuit that outputs a recording signal including recording pulses, each of the recording pulses being provided in a train of divided pulses, one of the divided pulses having a greater pulse width than another of the divided pulses; a laser diode that is driven by the recording signal output by the recording signal output circuit, to generate recording laser light power to be used for recording information on an optical disk with a mark-length recording scheme; a recording power detector circuit that detects the recording laser light power emitted by the laser diode, at predetermined timing corresponding to the one divided pulse having the greater pulse width; and a recording laser-driving current control circuit that controls a laser-driving current of the recording pulse, in such a manner that a value of the recording laser light power detected by the recording power detector circuit follows a predetermined reference value.

According to still another aspect of the present invention, there is provided a laser diode driving circuit which is characterized by setting a smaller laser-driving current value for the greater-width divided pulse than for the other or smaller-width divided pulse. Namely, this laser diode driving circuit comprises: a recording signal output circuit that outputs a recording signal including a recording pulse, the recording pulse being provided in a train of divided pulses, a smaller laser-driving current value being set for the one divided pulse than for the other divided pulse, the recording signal including a finite value of laser-driving current for generating bottom laser light power, smaller than recordable-level laser light power, in a part or whole of a section in between the recording pulses; a laser diode that is driven by the recording signal output by the recording signal output circuit, to generate recording laser light power to be used for recording information on an optical disk with a mark-length recording scheme; a bottom power detector circuit that detects the recording laser light power emitted by the laser diode, at predetermined timing corresponding to the bottom laser light power; an intermediate power detector circuit that detects the recording laser light power emitted by the laser diode, at predetermined timing corresponding to the one divided pulse having the greater pulse width; a bottom laser-driving current control circuit that controls a laser-driving current for the bottom laser light power, in such a manner that a value of the laser light power detected by the bottom power detector circuit follows a predetermined reference bottom power value; an intermediate laser-driving current control circuit that controls the laser-driving current provided by the one divided pulse having the greater pulse width, in such a manner that a value of the laser light power detected by the intermediate power detector circuit follows a predetermined reference intermediate power value; a recording laser-driving current computing circuit that computes a recording laser-driving current value to achieve a reference recording laser light power value predetermined for the other divided pulse having a smaller pulse width than the one divided pulse, on the basis of values of the laser-driving currents controlled by the bottom laser-driving current control circuit and the intermediate laser-driving current control circuit and a driving-current vs. output-laser-lightpower characteristic of the laser diode; and a recording laser-driving current control circuit that controls the laser-driving current provided by the other divided pulse, in such a manner that a value of the laser-driving current follows the recording laser-driving current value computed by the recording laser-driving current computing circuit.

BRIEF DESCRIPTION OF THE DRAWINGS

For better understanding of the above and other features of the present invention, preferred embodiments of the invention will hereinafter be described in detail with reference to the accompanying drawings, in which.

DETAILED DESCRIPTION OF THE PREFERRED EMBODIMENTS

[First Embodiment]

Figure 1:
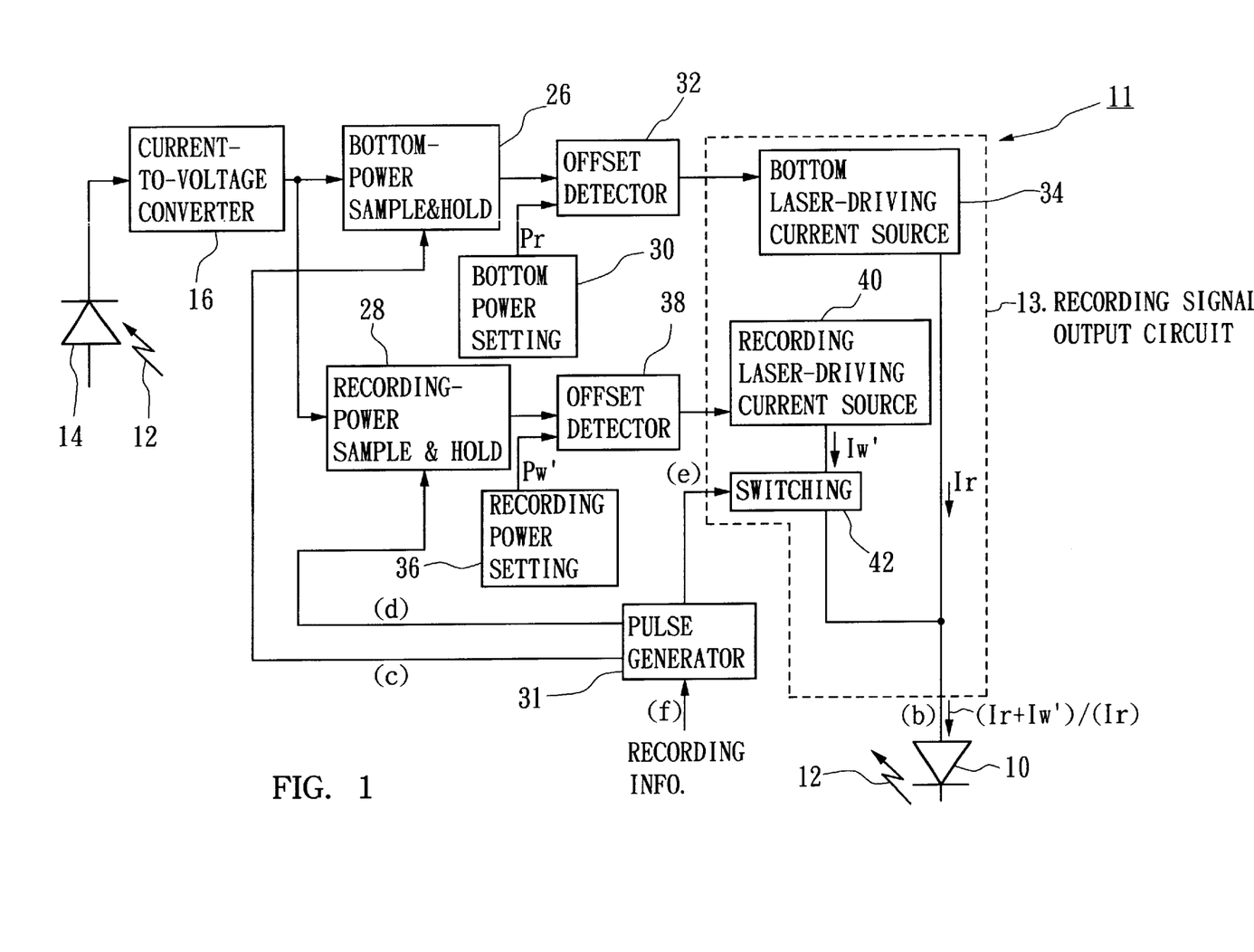
FIG. 1 is a block diagram illustrating a laser diode driving circuit in accordance with a first embodiment of the present invention.
Figure 6:
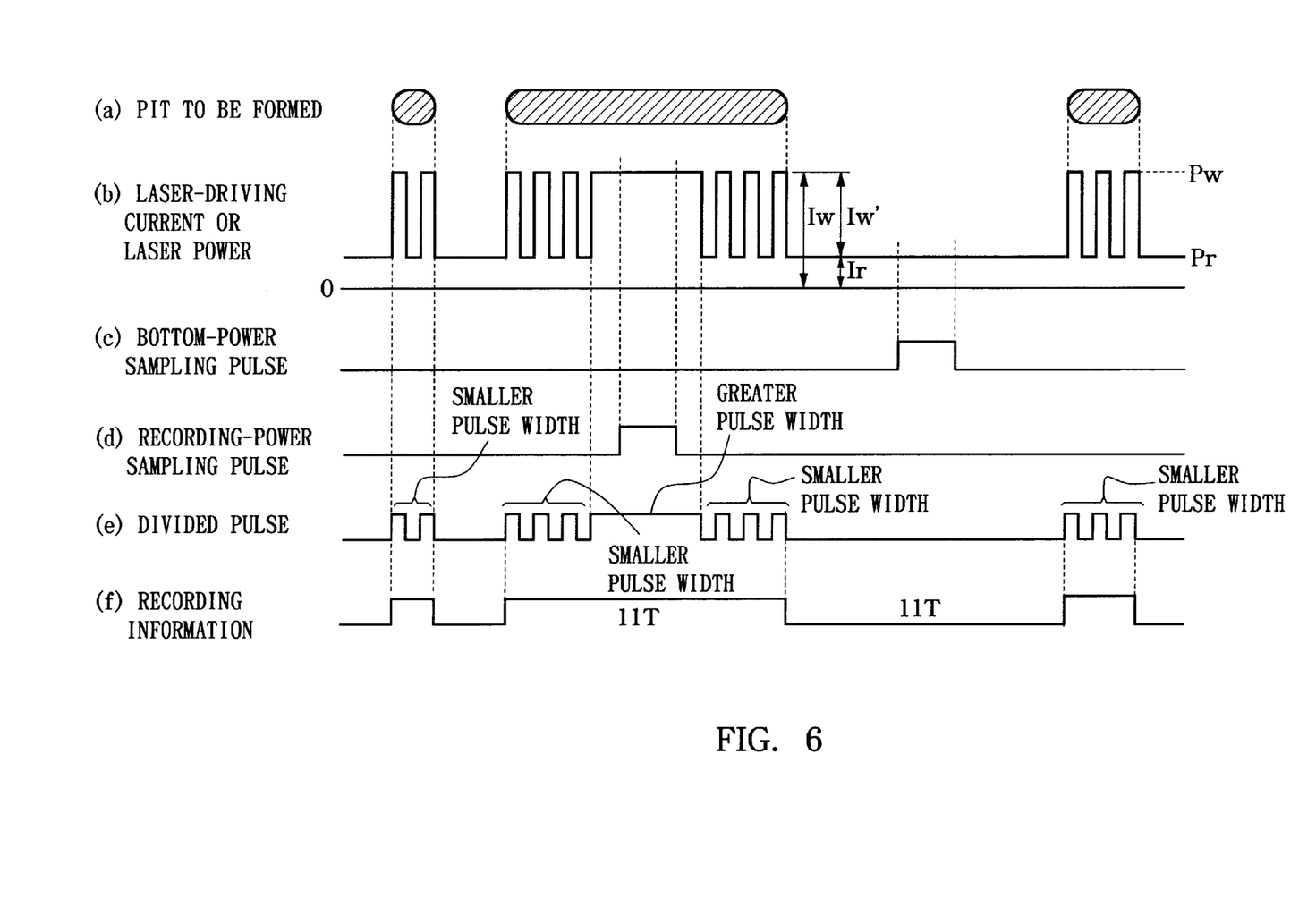
FIG. 6 is a waveform diagram explanatory of behavior of the laser diode driving circuit of FIG. 1.

FIG. 1 is a block diagram illustrating a laser diode driving circuit in accordance with a first embodiment of the present invention, and FIG. 6 is a waveform diagram explanatory of behavior of the laser diode driving circuit of FIG. 1. Sections (b) to (f) of FIG. 6 show voltage or current waveforms of signals denoted at (b) to (f), respectively, of FIG. 1. In the laser diode driving circuit 11 of FIG. 1, components enclosed by a dotted-line block 13 together constitute a circuit for outputting recording signals (i.e., a recording signal output circuit). Laser diode 10 emits laser light 12 for recording or reproducing data to or from an optical disk. The emitted laser light 12 from the diode 10 is received by a monitor diode 14 provided within an optical pickup. The monitor diode 14 may, for example, be arranged as a back monitor for receiving the laser light irradiated backward from the laser diode 10. Output current from the monitor diode 14 is converted into a voltage signal via a current-to-voltage converter 16, and the converted output voltage from the converter 16 is passed to both a bottom-power sample and hold circuit 26 and a recording-power sample and hold circuit 28.

Pulse generator circuit 31 outputs pulse signals as shown in sections (c) to (e) of FIG. 6 in accordance with input recording information shown in section (f) of FIG. 6. More specifically, section (e) shows divided pulses corresponding to the input recording information; in the illustrated example, only a central one of the divided pulses, for forming a 11T pit of a synchronizing signal having a 11T—11T pattern based on the CD standard, has a relatively great pulse width (which will therefore hereinafter be referred to as a "greater-width divided pulse"), and all of the other divided pulses have a smaller pulse width (which will therefore hereinafter be referred to as "smaller-width divided pulses"). Section (d) shows a pulse for sampling the recording laser light power (i.e., a recording-power sampling pulse), which is generated at timing corresponding to the central region of the greater-width divided pulse. Section (c) shows a pulse for sampling bottom laser light power (i.e., a bottom-power sampling pulse), which is generated at timing corresponding to bottom laser light power generated at a point in between the recording pulses (in the illustrated example, at a point corresponding to the central region of the divided pulse train forming an 11T land of the 11T—11T synchronizing signal).

In response to the bottom-power sampling pulse, the bottom-power sample and hold circuit 26 of FIG. 1 samples and holds the output voltage of the current-to-voltage converter 16 as a detected bottom laser light power value. Bottom power setting device 30 outputs a reference voltage corresponding to a reference bottom laser light power value Pr predetermined depending on the optical disk used. Offset detector circuit 32 outputs an offset voltage corresponding to a difference or offset between the voltage sampled and held by the sample and hold circuit 26 and the reference voltage output from the bottom power setting device 30. Bottom laser-driving current source 34 outputs a bottom laser-driving current Ir, the value of which is controlled in accordance with the offset voltage output from the offset detector circuit 32, to drive the laser diode 10. With this control scheme, the bottom power of the laser light 12 is controlled to follow the predetermined reference bottom laser light power value Pr.

In response to the recording-power sampling pulse, the recording-power sample and hold circuit 28 samples and holds the output voltage of the current-to-voltage converter 16 as a detected recording laser light power value. Recording power setting device 36 outputs a reference voltage corresponding to a reference recording laser light power value Pw that is predetermined depending on the optical disk used: in this case, the reference recording laser light power value Pw is given as a difference Pw' from the reference bottom laser light power value Pr. Offset detector circuit 38 outputs an offset voltage corresponding to a difference or offset between the voltage sampled and held by the sample and hold circuit 28 and the reference voltage output by the recording power setting device 36. Recording laser-driving current source 40 outputs a recording laser-driving current Iw', the value of which is controlled in accordance with the offset voltage output from the offset detector circuit 38, to drive the laser diode 10. Specifically, the recording laser-driving current Iw' is passed by a switching circuit 42 in response to the divided pulses shown in section (e) of FIG. 6 and added with the bottom laser-driving current Ir, and the resultant added current drives the laser diode 10. With this control scheme, the recording power of the laser light 12 is controlled to follow the predetermined reference recording laser light power value Pw.

The above-described arrangements permit a sufficient pulse width of the recording-power sampling pulse shown in section (d) of FIG. 6, so that it achieves accurate detection of the recording laser light power even in high-speed, high-density recording and thus can control the recording laser light power with high precision. Further, because a long bottom level period and hence a sufficient pulse width of the bottom-power sampling pulse (section (c) of FIG. 6) are guaranteed, the above-described arrangements also achieve accurate detection of the bottom laser light power even in high-speed, high-density recording and thus can control the bottom laser light power with high precision.

In reproduction from the thus-recorded optical disk, the bottom laser-driving current Ir is output from the bottom laser-driving current source 34 as a reproducing laser-driving current while no recording laser-driving current Iw' is output, so that the laser light 12 of the bottom laser light power value is emitted from the laser diode 10 to reproduce the recorded data from the optical disk.

Figure 7:
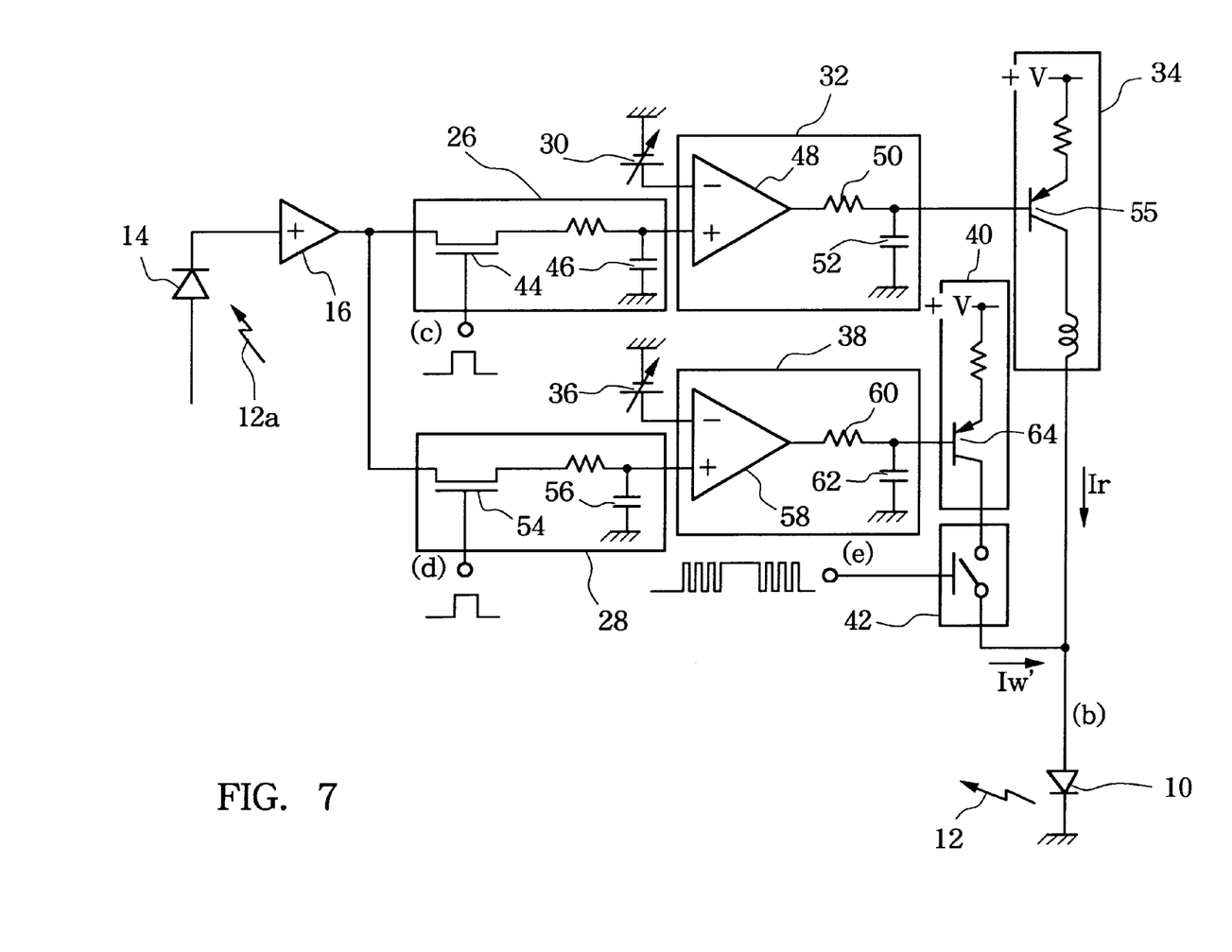
FIG. 7 is a diagram showing an exemplary detailed construction of the laser diode driving circuit of FIG. 1.

FIG. 7 is a diagram showing an exemplary detailed construction of the laser diode driving circuit 11 of FIG. 1. In this figure, reference characters (b) to (e) show parts to which are supplied the signals shown in sections (b) to (e) of FIG. 6, respectively. The bottom-power sample and hold circuit 26 turns on an analog gate circuit (FET) 44 in response to the bottom-power sampling pulse ((c) of FIG. 6) and holds a sampled voltage value in a condenser 46. The offset detector circuit 32 includes a differential amplifier 48 which outputs an offset voltage representing a difference between the voltage held by the condenser 46 and a reference voltage corresponding to a reference bottom laser light power value Pr set by the bottom power setting device 30, and this offset voltage is then smoothed via a resistance 50 and condenser 52. The bottom laser-driving current source 34 includes a transistor 55 that is controlled in accordance with the offset voltage output from the offset detector circuit 32, to supply a bottom laser-driving current Ir to the laser diode 10.

The recording-power sample and hold circuit 28 turns on an analog gate circuit (FET) 54 in response to the recording-power sampling pulse ((d) of FIG. 6) and holds a sampled voltage value in a condenser 56. The offset detector circuit 38 includes a differential amplifier 58 which outputs a voltage representing a difference between the voltage held by the condenser 56 and a reference voltage corresponding to a reference recording laser light power value Pw' set by the recording power setting device 36, and this offset voltage is then smoothed via a resistance 60 and condenser 62. The recording laser-driving current source 40 includes a transistor 64 that is controlled by the offset voltage output from the offset detector circuit 38, to supply a recording laser-driving current Iw' to the laser diode 10. Specifically, in response to the divided pulses shown in section (e) of FIG. 6, the recording laser-driving current Iw' is passed by the switching circuit 42, comprising an analog switch (e.g., switching transistor), for addition with the bottom laser-driving current Ir, and the resultant added current is fed to the laser diode 10.

[Second Embodiment]

Figure 8:
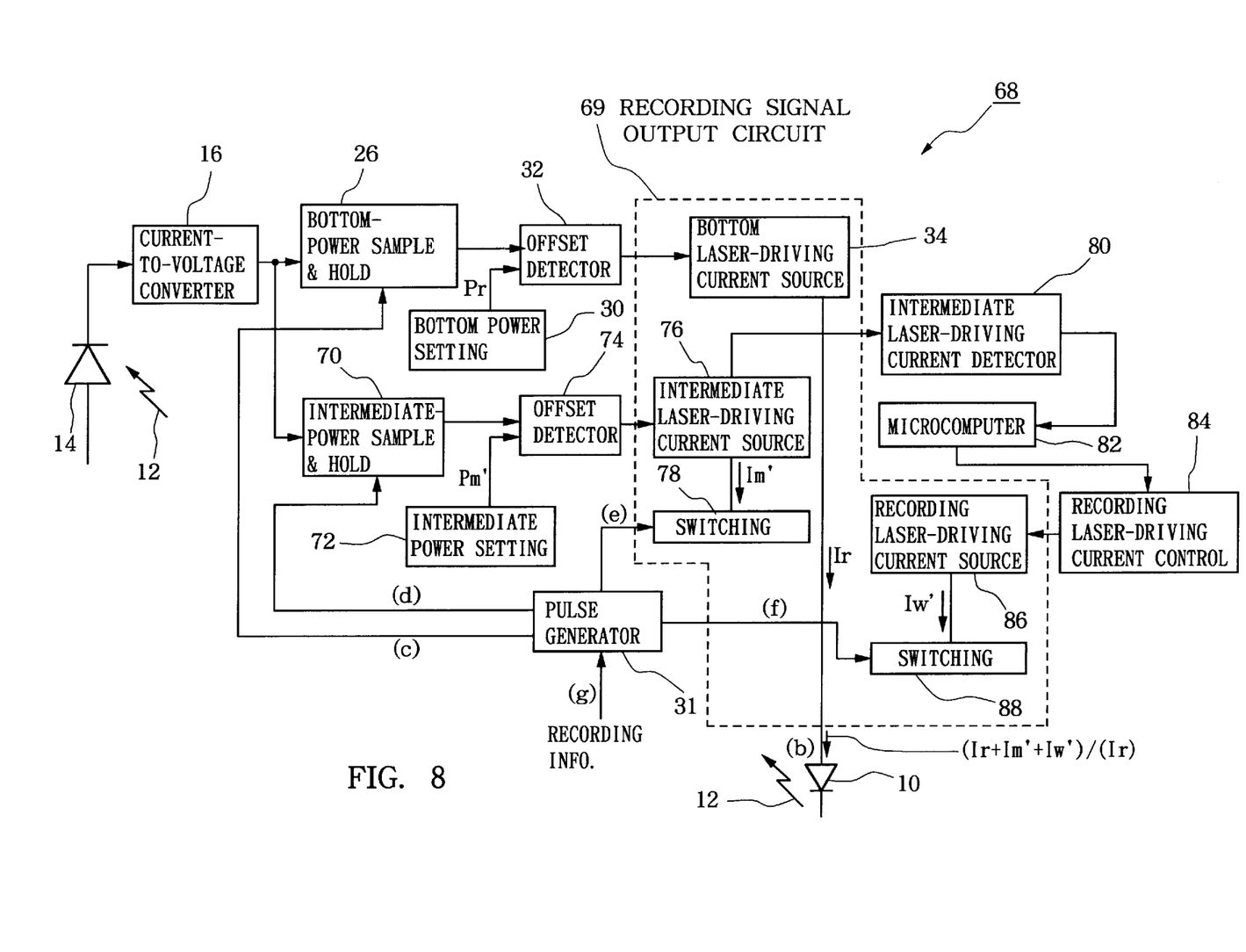
FIG. 8 is a block diagram illustrating a laser diode driving circuit in accordance with a second embodiment of the present invention.
Figure 9:
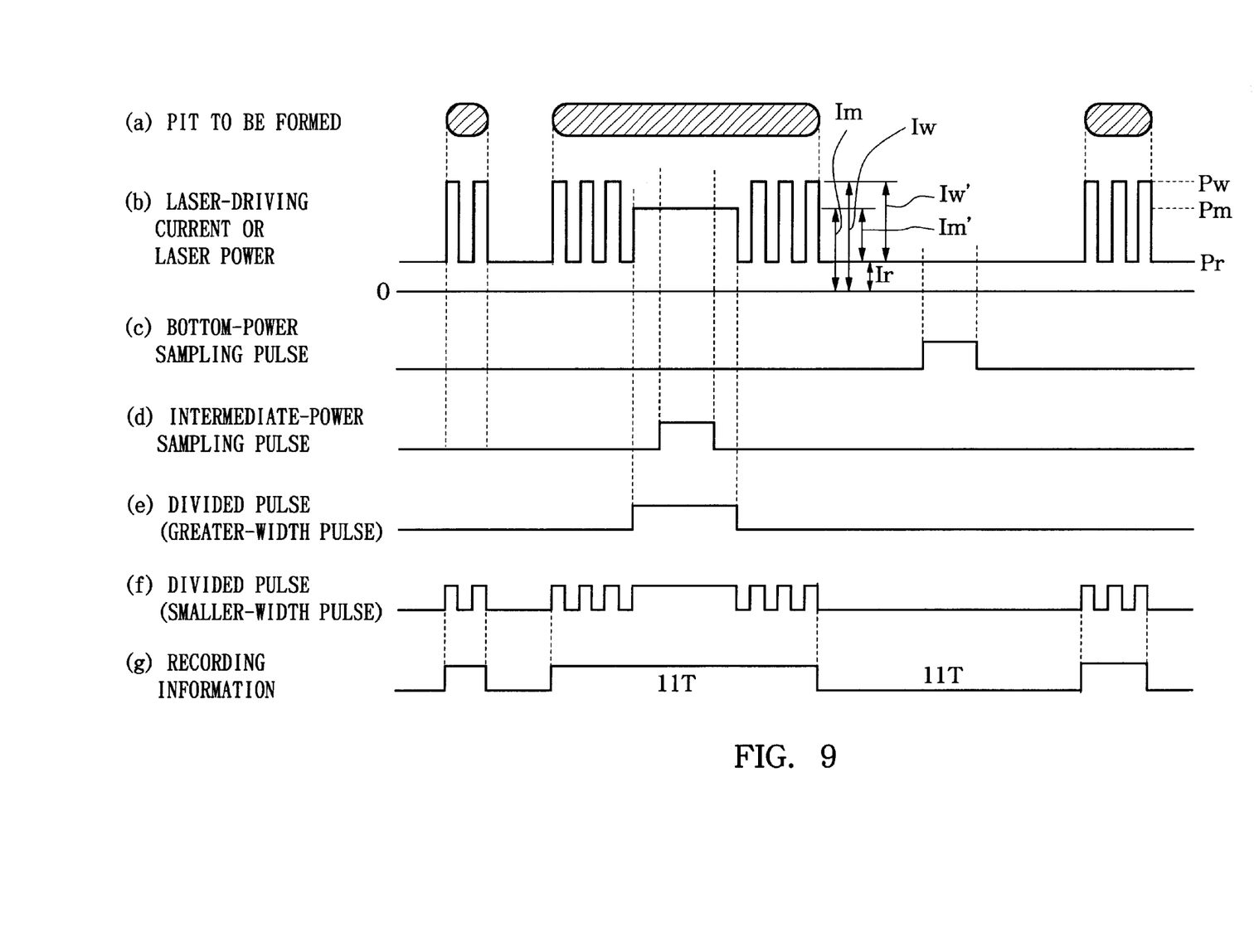
FIG. 9 is a waveform diagram explanatory of behavior of the laser diode driving circuit of FIG. 8.

FIG. 8 is a block diagram illustrating a laser diode driving circuit in accordance with a second embodiment of the present invention, and FIG. 9 is a waveform diagram explanatory of behavior of the laser diode driving circuit of FIG. 8. Sections (b) to (g) of FIG. 9 show voltage or current waveforms of signals denoted at (b) to (g), respectively, of FIG. 8. In the laser diode driving circuit 68 of FIG. 8, components enclosed by a dotted-line block 69 together constitute a circuit for outputting recording signals (i.e., a recording signal output circuit). Laser diode 10 emits laser light 12 for recording or reproducing data to or from an optical disk. The emitted laser light 12 from the diode 10 is received by a monitor diode 14 provided within an optical pickup. The monitor diode 14 may, for example, be arranged as a back monitor for receiving the laser light irradiated backward from the laser diode 10. Output current from the monitor diode 14 is converted into a voltage signal via a current-to-voltage converter 16, and the converted output voltage from the converter 16 is passed to both a bottom-power sample and hold circuit 26 and an intermediate-power sample and hold circuit 70.

Pulse generator circuit 31 outputs pulse signals as shown in sections (c) to (f) of FIG. 9 in accordance with input recording information shown in section (g) of FIG. 9. More specifically, section (f) shows divided pulses, corresponding to the recording information, from which a greater-width divided pulse is excluded and hence all of which are a smaller-width pulse. Section (e) shows the greater-width divided pulse extracted from among the divided pulses, which is generated at timing corresponding to the central region of the divided pulses forming an 11T pit of a synchronizing signal having a 11T—11T pattern based on the CD standard. Section (d) shows a pulse for sampling intermediate laser light power (i.e., an intermediate-power sampling pulse), which is generated at timing corresponding to the central location of the greater-width divided pulse. Section (c) shows a pulse for sampling bottom laser light power (i.e., a bottom-power sampling pulse), which is generated at timing corresponding to bottom laser light power between the recording pulses (in the illustrated example, at a point corresponding to the central region of the divided pulses forming a 11T land of the 11T—11T synchronizing signal).

In response to the bottom-power sampling pulse, the bottom-power sample and hold circuit 26 of FIG. 1 samples and holds the output voltage of the current-to-voltage converter 16 as a detected bottom laser light power value. Bottom power setting device 30 outputs a reference voltage corresponding to a reference bottom laser light power value Pr that is predetermined depending on the optical disk used. Offset detector circuit 32 outputs an offset voltage corresponding to a difference or offset between the voltage sampled and held by the sample and hold circuit 26 and the reference voltage output from the bottom power setting device 30. Bottom laser-driving current source 34 outputs a bottom laser-driving current Ir, the value of which is controlled in accordance with the offset voltage output from the offset detector circuit 32, to drive the laser diode 10. With this control scheme, the bottom power of the laser light 12 is controlled to follow the predetermined reference bottom laser light power value Pr.

In response to the intermediate-power sampling pulse, the intermediate-power sample and hold circuit 70 samples and holds the output voltage of the current-to-voltage converter 16 as a detected intermediate laser light power value. Intermediate power setting device 72 outputs a reference voltage corresponding to a reference intermediate laser light power value Pm that is predetermined depending on the optical disk used; in this case, the reference intermediate laser light power value Pm is given as a difference Pm' from the reference bottom laser light power value Pr. Offset detector circuit 74 outputs an offset voltage corresponding to a difference or offset between the voltage sampled and held by the sample and hold circuit 70 and the reference voltage output by the setting device 72. Intermediate laser-driving current source 76 outputs an intermediate laser-driving current Im', the value of which is controlled in accordance with the offset voltage output from the offset detector circuit 74, to drive the laser diode 10. Specifically, the intermediate laser-driving current Im' is passed by a switching circuit 78 in response to the greater-width divided pulse shown in section (e) of FIG. 9 and added with the bottom laser-driving current Ir, and the resultant added current drives the laser diode 10. With this control scheme, the recording power of the laser light 12 is controlled to follow the predetermined reference intermediate laser light power value Pm.

Figure 10:
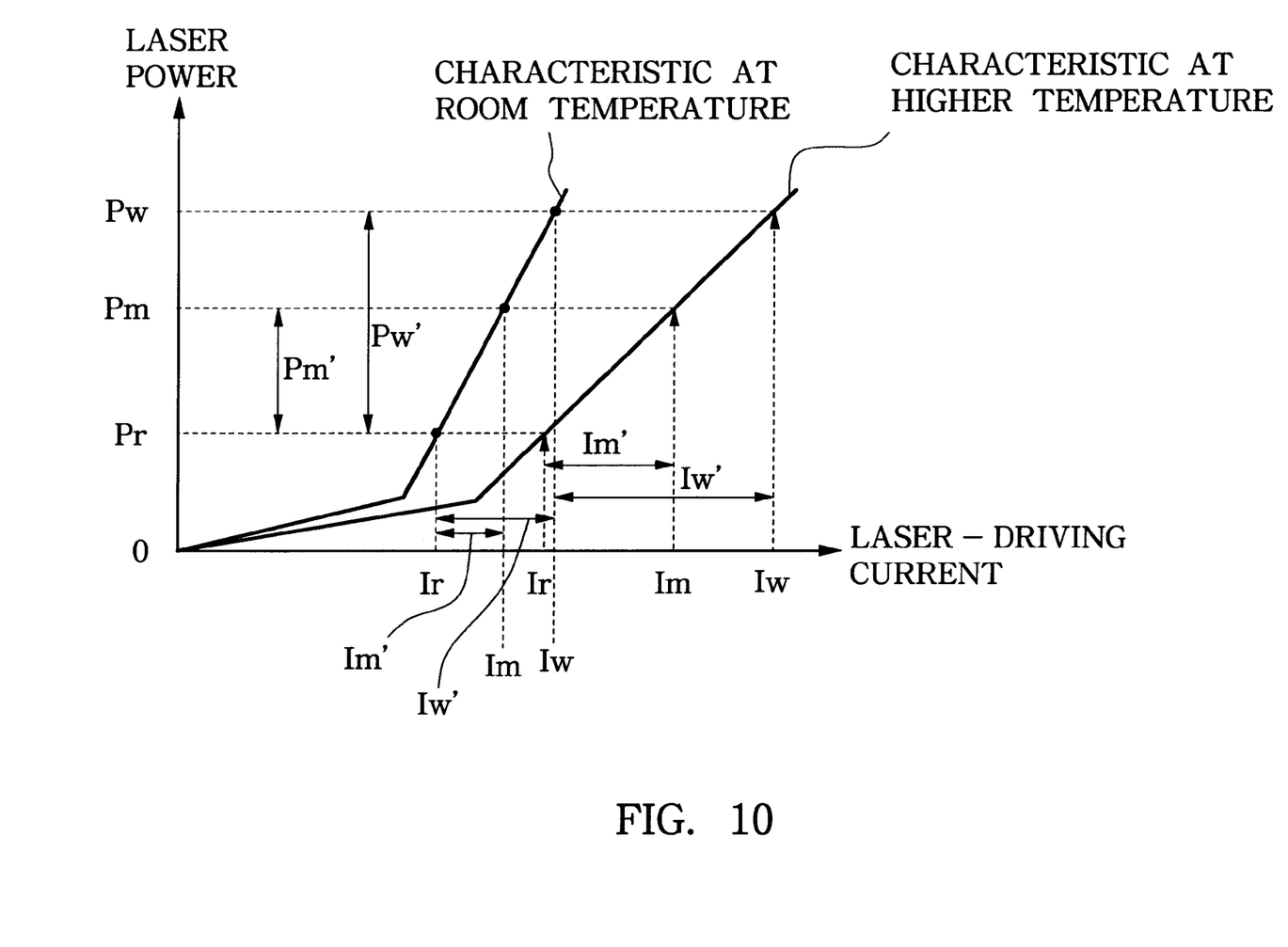
FIG. 10 is a diagram showing a "driving-current vs. output-laser-light-power" characteristic of a laser diode employed in the second embodiment.

Intermediate laser-driving current detector circuit 80 of FIG. 8 detects a value of the intermediate laser-driving current Im' having been controlled in the above-described manner. On the basis of the detected value of the intermediate laser-driving current Im' and a "driving-current vs. output-laser-light-power" characteristic of the laser diode 10, a microcomputer 82 computes a value of a laser-driving current to achieve a reference recording laser light power value Pw that is predetermined for the smaller-width divided pulses; in this instance, the laser-driving current value Iw' is given as a difference from the reference bottom laser light power value Pr. As shown in FIG. 10, the "driving-current vs. output-laser-light-power" characteristic of the laser diode 10 presents some linearity and varies with a different inclination depending on an ambient temperature. Because the reference bottom laser light power value Pr, reference intermediate laser light power value Pm and reference recording laser light power value Pw are predetermined depending on the optical disk used and the intermediate laser-driving current Im' has been detected by the intermediate laser-driving current detector circuit 80, the laser-driving current value Iw' for controlling the recording laser light power to follow the reference recording laser light power value Pw may be computed from the following equation using the abovementioned values:

$$Iw'=Im'(Pw'/Pm'),$$

where Pw'=Pw−Pr, and Pm'=Pm−Pr.

The microcomputer 80 determines the laser-driving current value Iw' by use of the equation above. Recording laser-driving current control circuit 84 controls a recording laser-driving current source 86 in such a manner that the current source 86 outputs the laser-driving current value Iw'. The laser-driving current value Iw' is passed by a switching circuit 88, in response to the smaller-width divided pulse, for addition with the bottom laser-driving current Ir, and the resultant added current is fed to the laser diode 10. With this control scheme, the recording power of the laser light 12 is controlled to follow the predetermined reference recording laser light power value Pw.

In reproduction, the bottom laser-driving current Ir is output from the bottom laser-driving current source 34 as a reproducing laser-driving current while no intermediate and recording laser-driving currents Im' and Iw' are output, so that the laser light 12 of the bottom laser light power value is emitted from the laser diode 10 to reproduce the recorded data from the optical disk.

Figure 11:
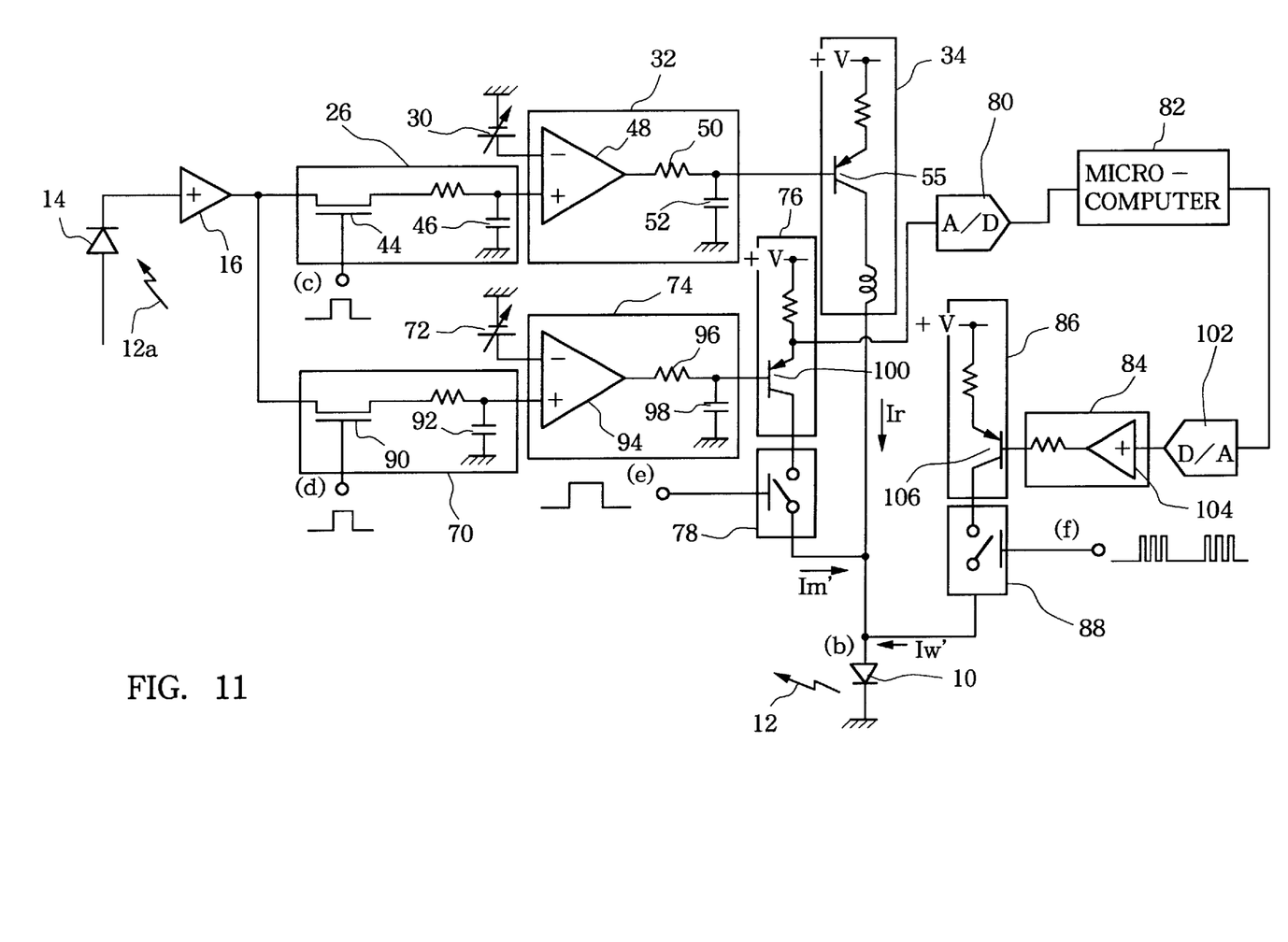
FIG. 11 is a diagram showing an exemplary detailed construction of the laser diode driving circuit of FIG. 8.

FIG. 11 is a diagram showing an exemplary detailed construction of the laser diode driving circuit 68 of FIG. 8. In this figure, reference characters (b) to (f) show parts to which are supplied the signals shown in sections (b) to (e) of FIG. 6, respectively. The bottom-power sample and hold circuit 26 turns on an analog gate circuit (FET) 44 in response to the bottom-power sampling pulse ((c) of FIG. 6) and holds a sampled voltage value in a condenser 46. The offset detector circuit 32 includes a differential amplifier 48 which outputs an offset voltage representing a difference between the voltage held by the condenser 46 and a reference voltage corresponding to a reference bottom laser light power value Pr set by the bottom power setting device 30, and this offset voltage is then smoothed via a resistance 50 and condenser 52. The bottom laser-driving current source 34 includes a transistor 55 that is controlled in accordance with the offset voltage output from the offset detector circuit 32, to supply a bottom laser-driving current Ir to the laser diode 10.

The intermediate-power sample and hold circuit 70 turns on an analog gate circuit (FET) 90 in response to the intermediate-power sampling pulse ((d) of FIG. 9) and holds a sampled voltage value in a condenser 92. The offset detector circuit 74 includes a differential amplifier 94 which outputs a voltage representing a difference between the voltage held by the condenser 92 and a reference voltage corresponding to a reference intermediate laser light power value Pm' set by the intermediate power setting device 72, and this offset voltage is then smoothed via a resistance 96 and condenser 98. The intermediate laser-driving current source 76 includes a transistor 100 that is controlled in accordance with the offset voltage output from the offset detector circuit 74, to supply an intermediate laser-driving current Im' to the laser diode 10. Specifically, in response to the greater-width divided pulse shown in section (e) of FIG. 9, the intermediate laser-driving current Im' is passed by the switching circuit 78, comprising an analog switch (e.g., switching transistor), for addition with the bottom laser-driving current Ir, and the resultant added current drives the laser diode 10.

Further, an A/D converter 80 in FIG. 11, which constitutes the intermediate laser-driving current detector circuit 80, converts, into digital representation, emitter potential of the transistor 100 that varies in accordance with the intermediate laser-driving current Im'. The microcomputer 82 computes a recording laser-driving current value Iw' on the basis of the A/D-converted emitter potential output from the converter 80. The recording laser-driving current value Iw' thus computed by the microcomputer 82 is converted into an analog signal via a D/A converter 102, which is then sent, via an amplifier 104 of the recording laser-driving current control circuit 84, to a transistor 106 of the recording laser-driving current source 86. Thus, the transistor 106 is controlled in accordance with the D/A-converted value so that the laser-driving current value Iw' is output from the current source 86. Specifically, this laser-driving current value Iw' is passed by the switching circuit 88, in response to the smaller-width divided pulse, for addition with the bottom laser-driving current Ir, and the resultant added current drives the laser diode 10.

What is claimed is:

1. A method of controlling laser light power to be used for recording information on an optical disk in accordance with a mark-length recording scheme using recording laser light power emitted from a laser diode driven by a recording signal including recording pulses, said method comprising the steps of:

providing each of the recording pulses in a train of divided pulses, one of the divided pulses having a greater pulse width than other divided pulses, a smaller laser-driving current value being set for the one divided pulse having the greater pulse width than for the other divided pulses;

detecting, as a finite value of laser-driving current for generating bottom laser light power, smaller than recordable-level laser light power, in a part or whole of a section in between the recording pulses of the recording signal, laser-driving current values both at a predetermined time corresponding to the one divided pulse having the greater pulse width and at a predetermined time corresponding to the bottom laser light power;

controlling the laser-driving current values for the one divided pulse having the greater pulse width and for the bottom laser light power in such a manner that laser light power levels of the laser light power, detected by said step of detecting at the predetermined time corresponding to the one divided pulse having the greater pulse width and at the predetermined time corresponding to the bottom laser light power, correspond to respective predetermined reference values;

determining a recording laser-driving current value to achieve a reference recording laser-light-power value predetermined for the other divided pulses having a smaller pulse width than the one divided pulse having the greater pulse width, based on the laser-driving current values controlled by said step of controlling and a driving-current vs. output-laser-light-power characteristic of said laser diode; and controlling laser-driving current for the other divided pulses to correspond to the recording laser-driving current value determined by said step of determining.

2. A method as defined in claim 1 wherein said one divided pulse having the greater pulse width is placed at a selected position in the train of the divided pulses of one of the recording pulses that is for forming a greatest-length pit or for forming a near-greatest-length pit.

3. A laser diode driving circuit for an optical disk recording device comprising:

a recording signal output circuit that outputs a recording signal including a recording pulse, the recording pulse being provided in a train of divided pulses, one of the divided pulses having a greater pulse width than other divided pulses, a smaller laser-driving current value being set for the one divided pulse having the greater pulse width than for the other divided pulses, the recording signal including a finite value of laser-driving current for generating bottom laser light power, smaller than recordable-level laser light power, in a part or whole of a section in between the recording pulses;

a laser diode that is driven by the recording signal output by said recording signal output circuit, to generate recording laser light power to be used for recording information on an optical disk with a mark-length recording scheme;

a bottom power detector circuit that detects the recording laser light power emitted by said laser diode, at a predetermined time corresponding to the bottom laser light power;

an intermediate power detector circuit that detects the recording laser light power emitted by said laser diode, at a predetermined time corresponding to the one divided pulse having the greater pulse width;

a bottom laser-driving current control circuit that controls a laser-driving current for the bottom laser light power, in such a manner that a laser light power level of the laser light power detected by said bottom power detector circuit corresponds to a predetermined reference bottom power value;

an intermediate laser-driving current control circuit that controls the laser-driving current provided by the one divided pulse having the greater pulse width, in such a manner that a laser light power level of the laser light power detected by said intermediate power detector circuit corresponds to a predetermined reference intermediate power value;

a recording laser-driving current computing circuit that computes a recording laser-driving current value to achieve a reference recording laser light power value predetermined for the other divided pulses having a smaller pulse width than the one divided pulse having the greater pulse width, based on values of the laser-driving currents controlled by said bottom laser-driving current control circuit and said intermediate laser-driving current control circuit and a driving-current vs. output-laser-light-power characteristic of said laser diode; and a recording laser-driving current control circuit that controls laser-driving current provided by the other divided pulses, in such a manner that a value of the laser-driving current corresponds to the recording laser-driving current value computed by said recording laser-driving current computing circuit.

4. A method of controlling laser light power to be used for recording information on an optical disk in accordance with a mark-length recording scheme using recording laser light power emitted from a laser diode driven by a recording signal including recording pulses, said method comprising the steps of:

providing a train of the recording pulses, one of the recording pulses having a greater pulse width than other recording pulses;

detecting the recording laser light power at a predetermined time corresponding to the one recording pulse having the greater pulse width; and controlling a laser-driving current corresponding to the one recording pulse having the greater pulse width in such a manner that a recording laser light power level equals a predetermined reference power level.

5. The method according to claim 4, wherein the one recording pulse having the greater pulse width is placed at a selected position in the train of the recording pulses to form a greatest-length pit.

6. The method according to claim 4, wherein the one recording pulse having the greater pulse width is placed at a selected position in the train of the recording pulses to form a near-greatest-length pit.

7. The method according to claim 4, wherein amplitudes of the recording pulses are substantially equal.

8. The method according to claim 4, wherein an amplitude of the one recording pulse having the greater pulse width is smaller than amplitudes of the other recording pulses.

9. A laser diode system for an optical disk recording device comprising:

a recording signal output circuit that outputs a recording signal including a train of recording pulses, one of the recording pulses having a greater pulse width than other recording pulses;

a laser diode that is driven by the recording signal output by said recording signal output circuit, to generate recording laser light power to be used for recording information on an optical disk;

a recording power detector circuit that detects the recording laser light power emitted by said laser diode, at a predetermined time corresponding to the one recording pulse having the greater pulse width; and a recording laser-driving current control circuit that controls a laser-driving current corresponding to the recording pulse having the greater pulse width, in such a manner that a recording laser light power level equals a predetermined reference power level.

10. The laser diode system according to claim 9, wherein the one recording pulse having the greater pulse width is placed at a selected position in the train of the recording pulses to form a greatest-length pit.

11. The laser diode system according to claim 9, wherein the one recording pulse having the greater pulse width is placed at a selected position in the train of the recording pulses to form a near-greatest-length pit.

12. The laser diode system according to claim 9, wherein amplitudes of the recording pulses are substantially equal.

13. The laser diode system according to claim 9, wherein an amplitude of the one recording pulse having the greater pulse width is smaller than amplitudes of the other recording pulses.

14. A method of controlling laser light power to be used for recording information on an optical disk in accordance with a mark-length recording scheme using recording laser light power emitted from a laser diode driven by a recording signal including recording pulses, said method comprising the steps of:

provi­ding a train of the recording pulses, one of the recording pulses having a greater pulse width than other recording pulses, and a smaller laser-driving current value being set for the one recording pulse having the greater pulse width;

detecting, as a finite value of laser-driving current for generating lower laser light power, smaller than recordable-level laser light power, in a part or whole of a section in between the recording pulses of the recording signal, laser-driving current values both at a predetermined time corresponding to the one recording pulse having the greater pulse width and at a predetermined time corresponding to the lower laser light power;

controlling the laser-driving current values for the one recording pulse having the greater pulse width and for the lower laser light power in such a manner that laser light power levels correspond to respective predetermined reference power levels;

determining a recording laser-driving current value to achieve a reference recording laser-light-power value predetermined for the other recording pulses having a smaller pulse width than the one recording pulse having the greater pulse width, based on the laser-driving current values controlled by said step of controlling and a driving-current vs. output-laser-light-power characteristic of said laser diode; and controlling laser-driving current for the other recording pulses to correspond to the recording laser-driving current value determined by said step of determining.

15. A laser diode system for an optical disk recording device comprising:

a recording signal output circuit that outputs a recording signal including a train of recording pulses, one of the recording pulses having a greater pulse width than other recording pulses, and a smaller laser-driving current value being set for the one recording pulse having the greater pulse width, the recording signal including a finite value of laser-driving current for generating lower laser light power, smaller than recordable-level laser light power, in a part or whole of a section in between the recording pulses;

a laser diode that is driven by the recording signal output by said recording signal output circuit, to generate recording laser light power to be used for recording information on an optical disk;

a lower power detector circuit that detects the recording laser light power emitted by said laser diode, at a predetermined time corresponding to the lower laser light power;

an intermediate power detector circuit that detects the recording laser light power emitted by said laser diode, at a predetermined time corresponding to the one recording pulse having the greater pulse width;

a lower laser-driving current control circuit that controls a laser-driving current for the lower laser light power, in such a manner that a lower laser light power level corresponds to a predetermined reference lower power level;

an intermediate laser-driving current control circuit that controls the laser-driving current provided by the one recording pulse having the greater pulse width, in such a manner that an intermediate laser light power level corresponds to a predetermined reference intermediate power level;

a recording laser-driving current computing circuit that computes a recording laser-driving current value to achieve a reference recording laser light power level predetermined for the other recording pulses having a smaller pulse width than the one recording pulse having the greater pulse width, based on values of the laser-driving currents controlled by said lower laser-driving current control circuit and said intermediate laser-driving current control circuit and a driving-current vs. output-laser-light-power characteristic of said laser diode; and a recording laser-driving current control circuit that controls laser-driving current corresponding to the other recording pulses, in such a manner that a value of the laser-driving current corresponds to the recording laser-driving current value computed by said recording laser-driving current computing circuit.

* * * * *